US00RE50763E

(19) United States
(12) Reissued Patent
Johnsen et al.

(10) Patent Number: US RE50,763 E
(45) Date of Reissued Patent: Jan. 27, 2026

(54) FISHING TOOL WITH ELECTRIC RELEASE

(71) Applicant: Autentik AS, Stavanger (NO)

(72) Inventors: Geir Magne Mo Johnsen, Stavanger (NO); Alexander Ibragimov, Sola (NO); Stian Krag, Randaberg (NO); Polina Ibragimova, Sola (NO)

(73) Assignee: Autentik AS, Stavanger (NO)

(21) Appl. No.: 18/195,561

(22) Filed: May 10, 2023

Related U.S. Patent Documents

Reissue of:
(64) Patent No.: 11,002,100
Issued: May 11, 2021
Appl. No.: 16/639,261
PCT Filed: Aug. 20, 2018
PCT No.: PCT/NO2018/050214
§ 371 (c)(1),
(2) Date: Feb. 14, 2020
PCT Pub. No.: WO2019/035726
PCT Pub. Date: Feb. 21, 2019

(30) Foreign Application Priority Data

Aug. 18, 2017 (NO) ..... 20171373

(51) Int. Cl.
*E21B 31/18* (2006.01)
*E21B 23/02* (2006.01)
(Continued)

(52) U.S. Cl.
CPC ..... *E21B 31/18* (2013.01); *E21B 23/02* (2013.01); *E21B 31/20* (2013.01); *E21B 33/129* (2013.01)

(58) Field of Classification Search
CPC ..... E21B 31/20; E21B 31/18; E21B 33/129; E21B 23/02
See application file for complete search history.

(56) References Cited

U.S. PATENT DOCUMENTS 3,152,829 A * 10/1964 Steele, Sr. ..... E21B 31/18 294/86.23
3,588,165 A * 6/1971 Varga ..... E21B 31/18 294/203
(Continued)

FOREIGN PATENT DOCUMENTS

EP 0 552 087 A2 7/1993
WO WO-2013079573 A1 6/2013
(Continued)

OTHER PUBLICATIONS

Eriksson, Magnus, International Search Report Mailed Oct. 29, 2018 in International Application No. PCT/NO2018/050214, 3 pages.

*Primary Examiner* — William C Doerrler
(74) *Attorney, Agent, or Firm* — Nixon & Vanderhye P.C.

(57) ABSTRACT

A fishing tool (1) configured to retrieve a fish (100) from a wellbore, having a fish engagement arrangement (3) with fish engagement means (5) configured to lock the fishing tool to the fish inside a well. The fishing tool (1) has an electrically actuated fish disengagement arrangement (4), which is configured to unlock the fishing tool from the fish, wherein the fish disengagement arrangement (4) comprises an electric actuator (13). The fish disengagement arrangement (4) comprises a direct mechanical force link (6) between the electric actuator (13) and the fish engagement means (5), wherein the direct mechanical force link is configured to connect a mechanical force from the electric actuator (13) to the fish engagement means (5).

41 Claims, 9 Drawing Sheets

(51) Int. Cl.
*E21B 31/20* (2006.01)
*E21B 33/129* (2006.01)

(56) References Cited

U.S. PATENT DOCUMENTS

| | | | | |
|---|---|---|---|---|
| 3,863,974 | A | 2/1975 | Dinning | |
| 6,848,506 | B1 | 2/2005 | Sharp et al. | E21B 7/046 294/86.12 |
| 7,591,314 | B2 * | 9/2009 | Sonnier | E21B 47/00 |

FOREIGN PATENT DOCUMENTS

| | | | |
|---|---|---|---|
| WO | WO-2015115909 | A1 | 8/2015 |
| WO | WO-2016140678 | A1 | 9/2016 |

* cited by examiner

FISHING TOOL WITH ELECTRIC RELEASE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a fishing tool for retrieving downhole well equipment.

BACKGROUND ART

In the field of well technology, fishing tools are used to retrieve various types of downhole equipment, which is installed or lost in the well, normally referred to as "a fish". Such equipment may for instance be a wellbore packer, a downhole pump, or other downhole tools. Such pieces of equipment are commonly provided with a profile for engagement with a fishing tool. Sometimes, however, such as after an unintended occurrence, there may be equipment stuck in the well without such a profile or with a damaged profile.

There are known various types of fishing tools, which are run by using different methods. Some are run on wireline, such as a slick line or an electric line. Performing fishing operations with a wireline is usually the most cost-efficient method. Other types of fishing tools are run on coiled tubing (CT), drill pipe, or other tubular methods.

It sometimes happens that the operator is not able to pull the fish out of the wellbore. He must then release the fishing tool from the fish to retrieve the tool. For fishing tools run on wireline, such release is performed by providing a downwardly or upwardly directed force onto the fishing tool. Typically, this force will shear off one or more shear pins, which releases the engagement between the fishing tool and the fish.

In more modern, horizontally drilled wells, it is difficult to apply such a mechanical release force onto the fishing tool. Due to friction forces, the operator cannot rely on gravity to provide the needed force. As a result, the operators need to run the fishing tool on a coiled tubing or a drill string, thus increasing complexity and cost. Alternatively, the operators may apply an additional release system above the fishing tool, but this results in a significant increase of the fish length after release.

Publication WO2016140678 discloses a fishing tool with a fish disconnection function. In this solution, a preloaded spring is configured to disengage the fishing tool from the fish. To activate the spring, a lug is pulled out of a spring-arresting engagement. The lug is pulled away by means of an electric motor. For this solution, the disengagement force, by which a fish engagement means shall be pulled out of engagement with the fish, is governed by the spring. Consequently, when the spring is activated, it will exert a predetermined force for disengagement. Moreover, this force can be applied only once, i.e. there it is not possible to make more than one disengagement attempt.

An object of the present invention may be to provide a fishing tool that can be run on a wireline and that can be used both in vertical and horizontal wells.

Another object of the present invention may be to provide a wireline fishing tool that can be disengaged from a connected fish by means of a novel fish disengagement arrangement.

An object of the invention may be to provide a wireline fishing tool that has a fish disengagement arrangement by means of which one may apply a disengagement force of varying size, and/or repeated application of a disengagement force.

SUMMARY OF INVENTION

According to a first aspect of the present invention, there is provided a fishing tool configured to retrieve a fish from a wellbore. The fishing tool has a fish engagement arrangement with fish engagement means configured to lock the fishing tool to the fish inside a well. The fish engagement means can typically be in form of latching dogs or similar components. The fishing tool further comprises an electrically actuated fish disengagement arrangement, which is configured to unlock the fishing tool from the fish. The fish disengagement arrangement has an electric actuator. According to the invention, the fish disengagement arrangement comprises a direct mechanical force link between the electric actuator and the fish engagement means. The direct mechanical force link is configured to connect a mechanical force from the electric actuator to the fish engagement means.

Thus, with such a fishing tool, the mechanical force produced by the electric actuator, such as an electric motor, is linked to the fish disengagement means, such as latching dogs.

With such a direct mechanical force link, it will be possible to re-position the fish disengagement means in the operating position with the electric actuator, after having been moved to a disengaging position.

Furthermore, the operator may in some embodiments choose the size of the disengaging force produced by the electric actuator.

Moreover, the operator may in some embodiments perform repeated attempts for disconnecting the fishing tool from the fish, in cases where the first attempt is not successful.

In some embodiments of the fishing tool according to the invention, the fish disengagement arrangement comprises a rotation to linear converter and the electric actuator is an electric rotary motor, which is functionally connected to the rotation to linear converter. In that way, a linear movement is provided by rotation of the electric rotary motor, wherein the linear movement provides disengagement of the fishing tool from the fish.

In some embodiments, the fishing tool according to the invention may have an electric battery and a control unit, wherein the control unit is programmed to perform repeated disconnection attempts, by operating the electric actuator, in a situation where a first disconnection attempt is unsuccessful.

In some embodiments involving such a control unit, the control unit cab be programmed to increase a disconnection force that is output from the electric actuator in succeeding disconnection attempts. Hence, in a situation where the fish engagement means seems to be stuck, the control unit can increase the mechanical disconnection force as a measure for disconnecting the fish despite of the fish engagement means being stuck.

In some embodiments, the fish engagement arrangement of the fishing tool may advantageously comprise a cone that is axially fixed with respect to a tool housing and the fish engagement means, in the form of a plurality of latching dogs that are configured to slide against the cone when moved axially with respect to the tool housing. Furthermore, the fish disengagement arrangement may be configured to move the latching dogs with respect to the cone upon actuation.

The fishing tool may in some embodiments further comprise a mechanical disconnection arrangement having one or more shear pins. In such embodiments, the mechanical disconnection arrangement may serve as an auxiliary disconnection means. Hence, in a situation where the electric actuator or associated components malfunctions, the operator may use the mechanical disconnection arrangement as an auxiliary measure.

The mechanical disconnection arrangement can advantageously be configured to pull the latching dogs off their engagement with the cone when the shear pins are in a shorn off state.

According to a second aspect of the present invention, there is provided a method of retrieving a fishing tool from a downhole position in a subterranean well, wherein the fishing tool is locked to a fish in the well. The method comprises the following step:

a) providing electric power to an electric actuator in the fishing tool, thereby actuating an electric fish disengagement arrangement and disengaging the fishing tool from the fish. According to the second aspect of the invention, this can be performed by transferring a mechanical disconnecting force from the electric actuator to a fish engagement means over a direct mechanical force link arranged between the electric actuator and the fish engagement means.

In advantageous embodiments, step a) may comprise providing electric power to an electric rotary motor and providing a linear movement of a member of the fish disengagement arrangement.

In further embodiments, step a) may comprise programming a control unit to provide electric power from a battery in the fishing tool to said electric disengagement arrangement after a predetermined time.

Step a) may also in some embodiments comprise providing an electric signal from a surface to the electric actuator through an electric line.

The method according to the second aspect of the invention may also include programming a control unit in the fishing tool to perform repeated actuations of the electric actuator, in a situation where a first disconnection attempt is unsuccessful.

The method may also comprise programming a control unit in the fishing tool to perform succeeding disconnection attempts with increasing size of the disconnection force, as output from the electric actuator. In some embodiments, this may involve a continuous or discontinuous increase of force. In other embodiments, this may involve separate actuations of the electric actuator, between each actuation there is no output force.

BRIEF DESCRIPTION OF DRAWINGS

While the present invention has been discussed in general terms above, a more detailed example of embodiment will be given in the following with reference to the drawings, in which

FIG. 1 illustrates a typical scenario where a fishing tool according to the present invention is used. A piece of downhole equipment, or "a fish" 100, is positioned in a subterranean well 201 and shall be retrieved. In the situation shown in FIG. 1, the well is a subsea well. The fish 100 is positioned in a horizontal portion of the well. A fishing tool 1 is run on a wireline 203 from an offshore surface installation 205. The operator will connect the fishing tool 1 to the fish 100, and then pull both back up to the surface. If the operator is not able to push the fish 100 loose, he will disconnect the fishing tool 1 from the fish 100, and retrieve only the fishing tool.

FIG. 2 depicts a wireline fishing tool 1 according to the invention with a cross section side view, such as the one depicted in FIG. 1. At a front end, the tool 1 has a fish engagement arrangement 3. The fish engagement arrangement 3 is configured to lock against radially inwardly facing walls of a bore of a fish inside a wellbore. The fish engagement arrangement 3 comprises fish engagement means that are configured to engage and disengage with the fish 100. In this embodiment, the fish engagement means of the fish engagement arrangement 3 is in the form of axially moving latching dogs 5, which are configured to slide on a cone 7 of a central stem 9. The latching dogs 5 are arranged on the ends of latching fingers 11, which allow the latching dogs 5 to move radially when sliding on the cone 7. This will be described in closer detail further below.

Figure 1:
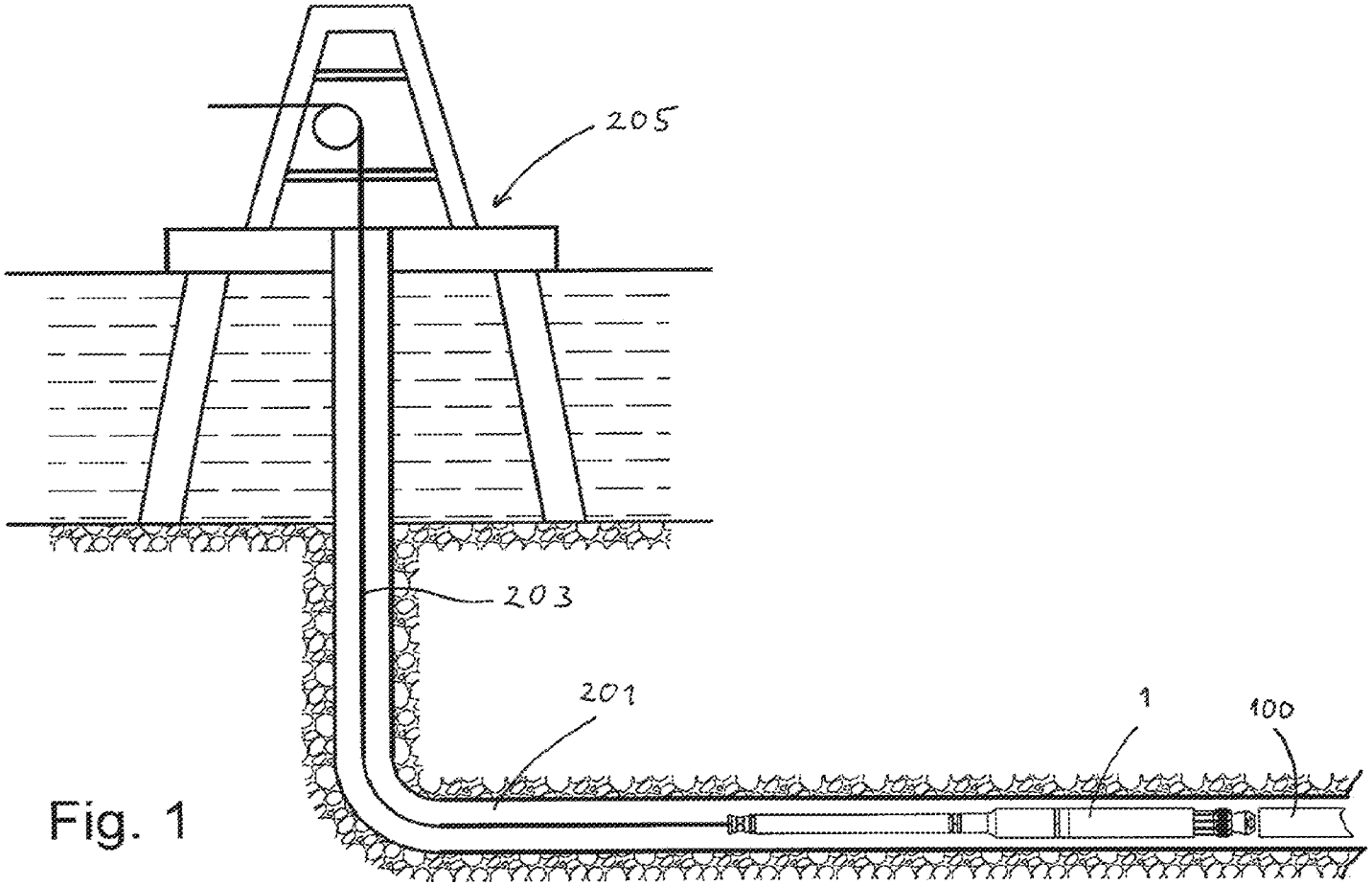
FIG. 1 is a schematic principle view of a fishing tool launched from a surface installation into a subsea well.

At an axial distance from the front end, the tool 1 has an electric motor 13. The electric motor 13 is functionally connected to a gear 15, which reduces the rotational output from the motor. A rotating shaft 17 connects to the gear 15. The rotating shaft is supported between a rear rotary bearing 19 and a front rotary bearing 21.

At a front portion of the rotating shaft 17, it is provided with a threaded section 23. On the threaded section 23 of the rotating shaft 17, there is arranged a nut 25. The threaded section 23 and the nut 25 form a rotation-to-linear converter, which converts the rotary movement of the electric motor into a liner movement. The linear movement of the nut 25 is parallel to the axial direction of the tool 1.

The nut 25 is connected to a pair of keys 27. The keys 27 are positioned in two slots 47 and thus prevent the nut 25 from rotating along with the rotating shaft 17. The keys 27 also transmit a disengagement force, as will be discussed in detail further below.

Figure 2:
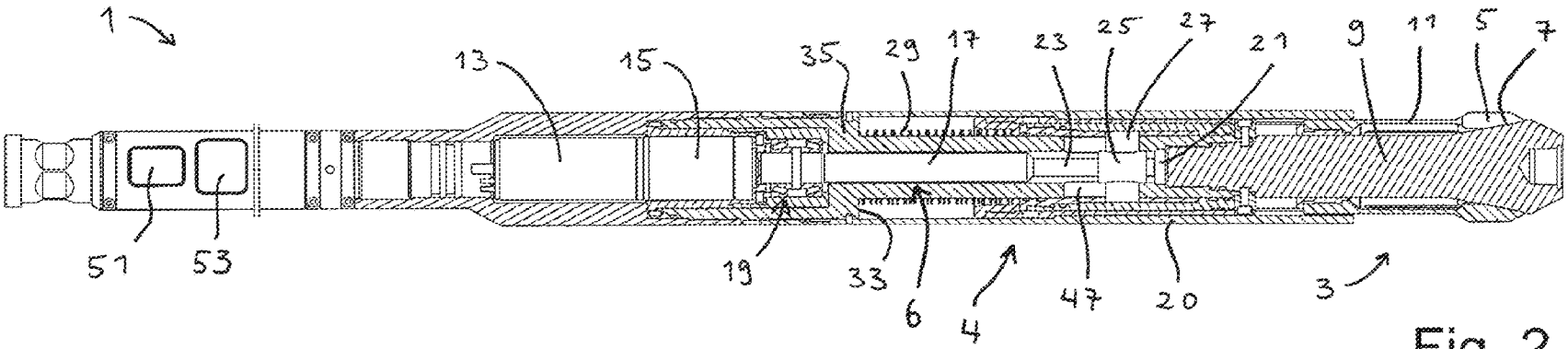
FIG. 2 is a cross section view of a fishing tool according to the present invention.

Also shown in FIG. 2 are a plurality of seals, which seal the tool internals from the well pressure. As the use of such seals are well known to the skilled person, they are not discussed further herein.

Figure 3:
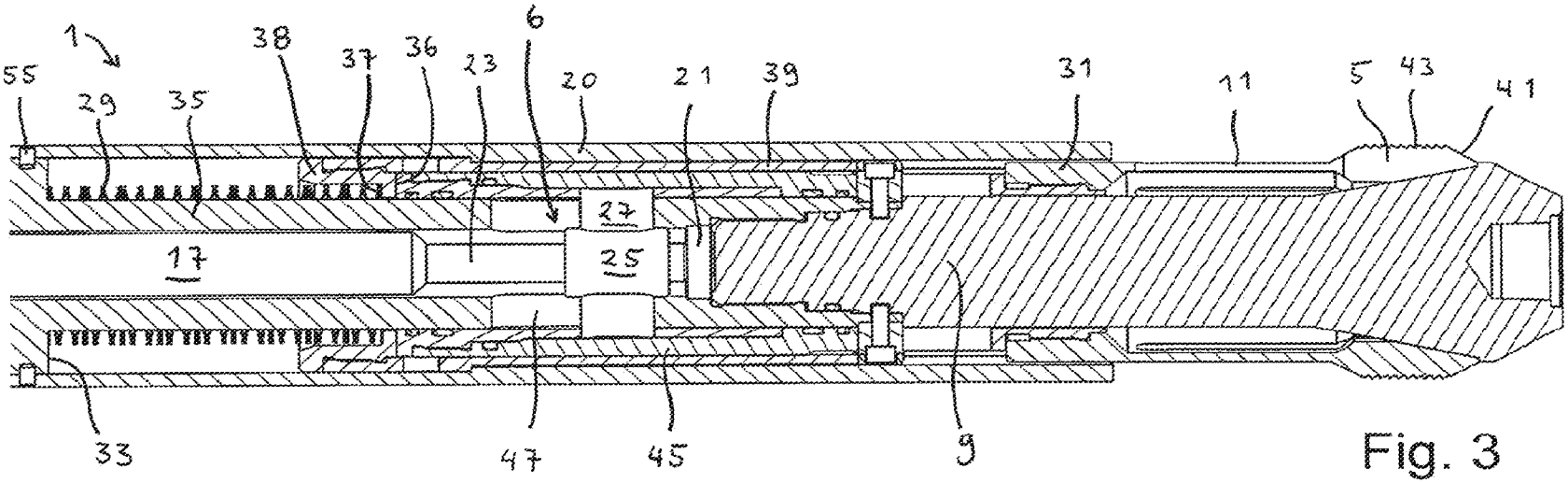
FIG. 3 is an enlarged cross section view through a front portion of the tool shown in FIG. 2, before engaging a downhole fish.

FIG. 3 is an enlarged cross section view showing a front portion of the tool 1 shown in FIG. 2. In FIG. 3, the fishing tool 1 is shown in a non-engaged position, i.e. it is not engaged with a fish. In position shown in FIG. 3, the latching dogs 5 are in a forward and hence radial outer position on the cone 7. This position is maintained with a spring 29 that bias the latching dogs 5 towards this forward position.

The latching dogs 5 are arranged on the ends of the respective latching fingers 11, which extend in an axial direction from a common latching sleeve 31. The latching sleeve 31 is configured to slide axially on a cylindrical portion of the central stem 9. As now will be appreciated by the skilled person, when in a forward position, the latching dogs 5 will be in an outer radial position. Further, when in a retracted position, the latching dogs 5 will be in a radial inner position, as they slide down (radially inwards) on the cone 7.

The axial extension of said spring 29 is in a rearward direction confined with a spring shoulder 33 arranged on a shaft housing 35. The rotating shaft 17 extends through a bore 34 in the shaft housing 35. At a front end, the spring 29 abuts a latching bias bottom shoulder 37 on an actuation member 38. The actuation member 38 is axially fixed to the latching dogs 5 via a sliding sleeve 39.

A tool housing, in the form of a housing sleeve 20, is arranged outside the shaft housing 35 and the central stem 9. The shaft housing 35 is axially fixed to the central stem 9.

The fishing tool 1 according to the embodiment shown in FIG. 3 is configured to engage inside the bore of a fish. Moreover, when in the situation shown in FIG. 3, the tool is prepared for entering into such engagement.

Figure 4:
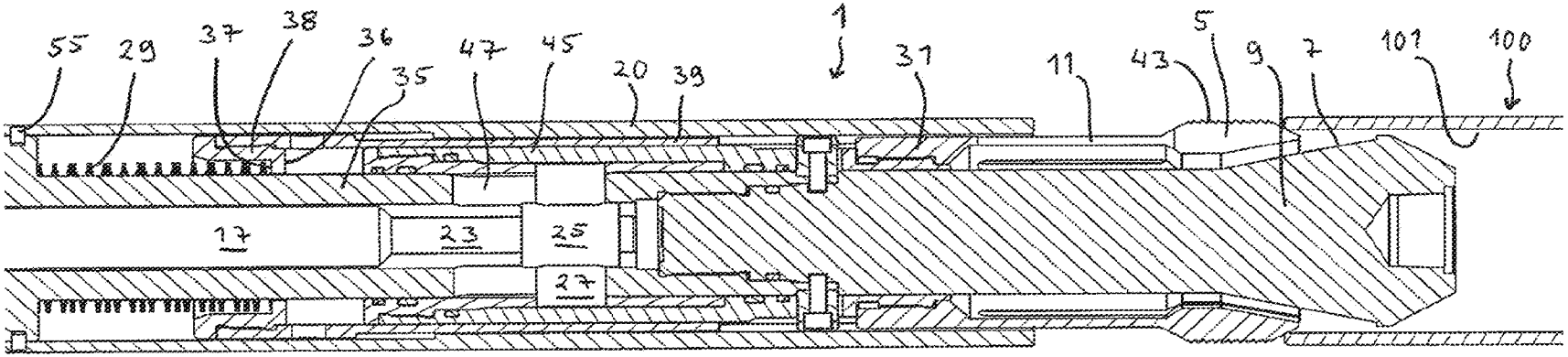
FIG. 4 is an enlarged cross section view corresponding to FIG. 3, where a front portion of the tool is about to enter the bore of a downhole fish.

FIG. 4 is a cross section side view corresponding to FIG. 3, however depicting the situation where the fishing tool 1 is entering into engagement with a fish 100. The fish 100 has a bore 101, into which a front head of the central stem 9 is inserted. While the central stem 9 fits into the bore 101, the latching dogs 5 do not when in the situation shown in FIG. 3 (namely when in the radially outer position). When the latching dogs 5 abut the fish (at the end of the bore 101), they are forced rearwards with respect to the central stem 9, along with the latching fingers 11, the latching sleeve 31, the sliding sleeve 39, and the latching bias bottom shoulder 37. During this rearward movement, the spring 29 is compressed. Moreover, the engagement between an outer, inclined dog face 41 on each of the latching dogs 5, and the edge of the bore 101, contributes in moving the latching dogs 5 radially inwards.

Eventually, when sliding on the cone 7, as the central stem 9 is moved axially forward into the bore 101 of the fish 100, the latching dogs 5 will fit inside the bore 101. The spring 29 will then push latching dogs 5 forward and ensure wedging of the latching dogs 5 between the cone 7 and the bore 101, when the fishing tool (central stem) is pulled backwards.

Figure 5:
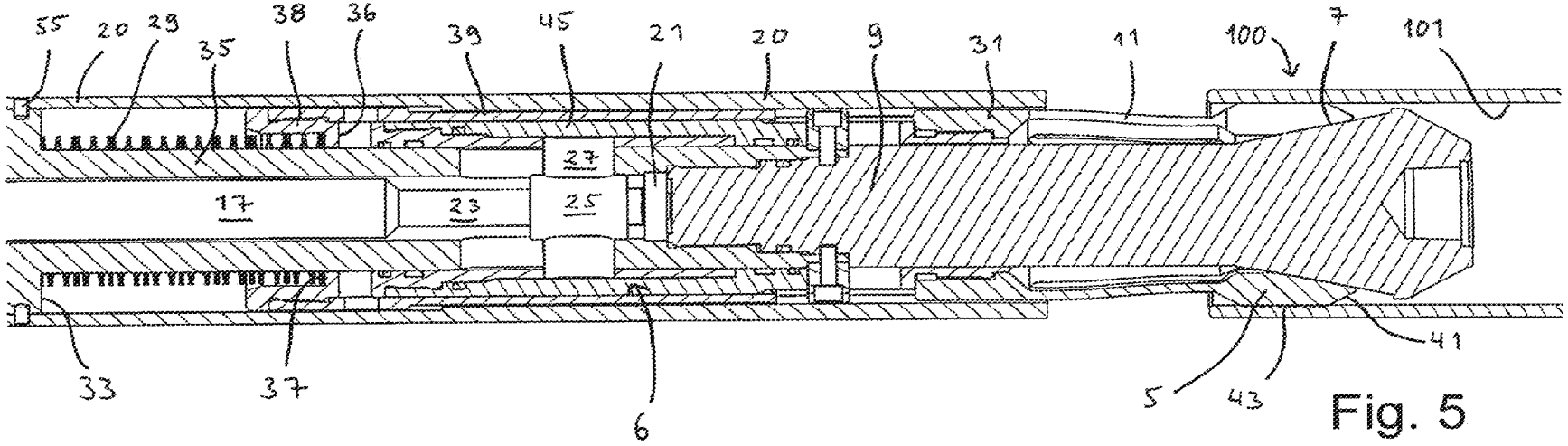
FIG. 5 is an enlarged cross section view corresponding to FIG. 4, where the tool has been locked to the bore of the fish.

Then, as the fishing tool 1 with its central stem 9 is pulled backwards, the latching dogs 5 will be squeezed between the bore 101 and the cone 7. This position is shown in FIG. 5. Latching teeth 43 arranged on the radially external face of each latching dog 5 will be forced into engagement with the bore 101, thus ensuring a fixed connection between the fishing tool 1 and the fish 100.

While this embodiment depicts connection of the fishing tool 1 to a slick bore 101, other embodiments may involve connection to a fish having a locking profile. Furthermore, some embodiments of the fishing tool may be configured to connect to an external face or profile of the fish, while other embodiments may be configured to connect to the internal face (bore) or profile of the fish.

As discussed introductorily, in some cases it may happen that the operator is not able to pull the fish 100 loose from the wellbore. He then needs to disengage the fishing tool 1 from the fish 100, so that he can retrieve the fishing tool 1. It is common to do this by exerting a forwardly directed disengagement force on the fishing tool 1.

Figure 6:
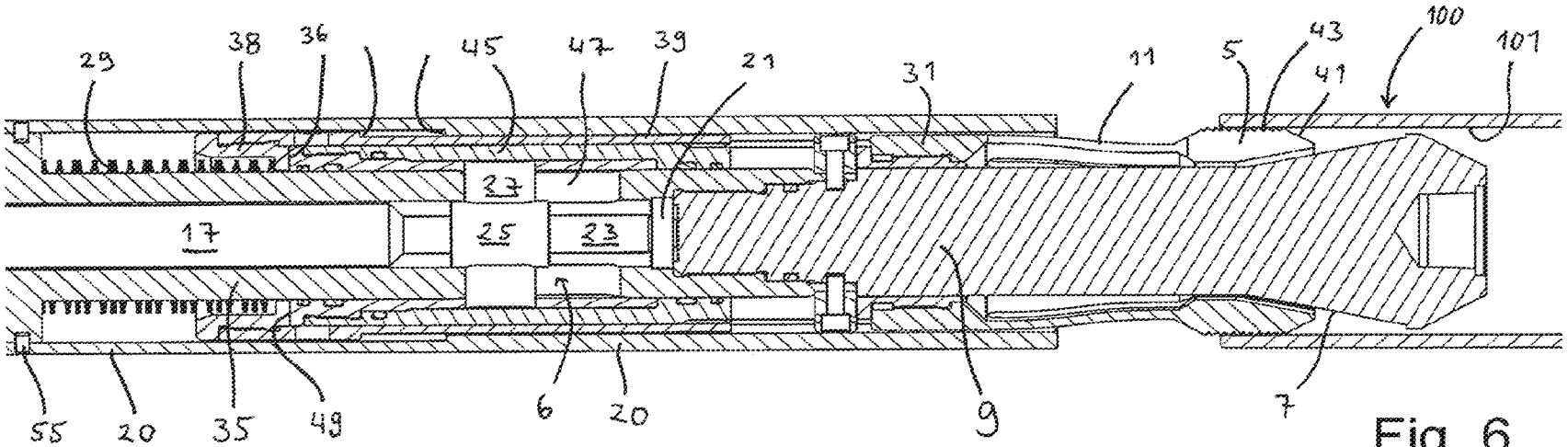
FIG. 6 is an enlarged cross section view corresponding to FIG. 6, wherein the fishing tool has been disengaged from its engagement with the fish by means of an electrically actuated fish disengagement arrangement.

With a fishing tool according to the present invention, however, the operator can disengage the fishing tool 1 from the fish 100 in another manner. FIG. 6 depicts disengagement of the fishing tool 1 from the fish 100 by means of an electrically actuated fish disengagement arrangement 4. By rotation of the rotating shaft 17, the nut 25 and the keys 27 are moved in an axially rearward direction. As discussed above, such rotation is accomplished by operation of the electric motor 13 (cf. FIG. 2).

In this embodiment, the fish disengagement arrangement 4 comprises inter alia the electric motor 13, the gear 15, the rotating shaft 17 and the rotation to linear converter 23, 25.

The keys 27 extend through slots 47 in the shaft housing 35, and are attached to a disengagement sleeve 45. The disengagement sleeve 45 is consequently moved axially rearwards along with the nut 25 and keys 27, when operating the electric motor 13.

At a rear end of the disengagement sleeve 45, there is a rearward facing disengagement shoulder 49. The disengagement shoulder 49 is configured to abut against a forward facing disengagement face 36 of the actuation member 38. Hence, by operation of the electric motor 13, the operator pulls the latching dogs 5, which are axially fixed with respect to the actuation member 38, in a rearward direction, with respect to the central stem 9. As a result, the latching dogs 5 are removed from their engagement with the cone 7, and may thus be released from engagement with the fish 100.

Notably, when operating the electric motor 13 to pull the latching dogs 5 in an axially rearward direction, the latching dogs 5 will initially remain axially fixed with respect to the fish 100, while the central stem 9 is moved axially forward.

As the skilled person now will appreciate, there is a direct mechanical force link 6 between the electric motor 13 and the latching dogs 5. In this embodiment, the direct mechanical force link 6 comprises the rotating shaft 17, the rotation-to-linear converter 23, 25, the disengagement sleeve 45, and the latching fingers 11.

As a result of the direct mechanical force link 6, a disengaging force from the electric actuator 13 can be transferred directly onto the fish engagement means/latching dogs 5. Consequently, one is not limited to the preload of a disengagement spring, which typically will be of a significantly lower force than the force from the electric actuator 13. The magnitude of the disengaging force from the electric actuator 13, which is applied on the fish engagement means 5 (i.e. the latching dogs) will of course depend on the gear 15, through which the force is transmitted. It will also depend on the pitch angle of the rotation-to-linear converter 23, 25.

Figure 7:
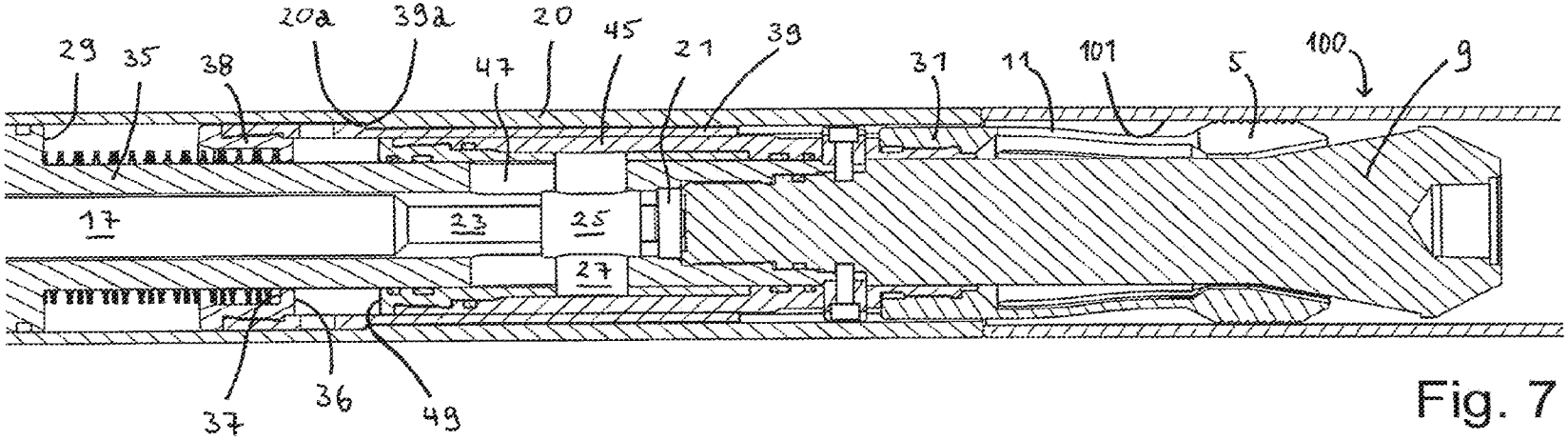
FIG. 7 is an enlarged cross section view corresponding to FIG. 5, wherein the fishing tool has been mechanically released from its engagement with the fish.

Advantageously, embodiments according to the present invention may also comprise a mechanical disconnection arrangement. Such embodiments are configured to be disengaged by means of a mechanical disengagement force, as an auxiliary disengagement measure. With the shown embodiment, such disengagement force is transmitted to the central stem 9, as shown in FIG. 7. By moving the central stem 9 forwards, as a result of the said disengagement force, the cone 7 is moved away from its engagement with the latching dogs 5, thus allowing the latching dogs 5 to disengage from the bore 101. The housing sleeve 20 of the fishing tool 1 abuts the edge of the bore 101 of the fish 100, and pulls the latching dogs 5 off the cone 7 of the central stem 9. This compresses the spring 29, and the central stem 9 and its cone 7 travels further into the fish. The mechanical disengagement arrangement is discussed in better detail below, with reference to FIG. 14 to FIG. 16.

FIG. 8 to FIG. 11 depict an alternative embodiment of a fishing tool 1 according to the present invention. Most of the components of this embodiment correspond to the embodiment discussed above with reference to FIG. 2 to FIG. 7, and their function will not be discussed again. Differing from the previous embodiment though, is the fish engagement arrangement 3.

While the fish engagement arrangement 3 of the embodiment depicted in FIG. 2 to FIG. 7 is configured for latching to a slick bore of a fish, the embodiment shown in FIG. 8 to FIG. 11 is configured to latch with a profile 103 in the bore 101 of the fish 100.

Figure 8:
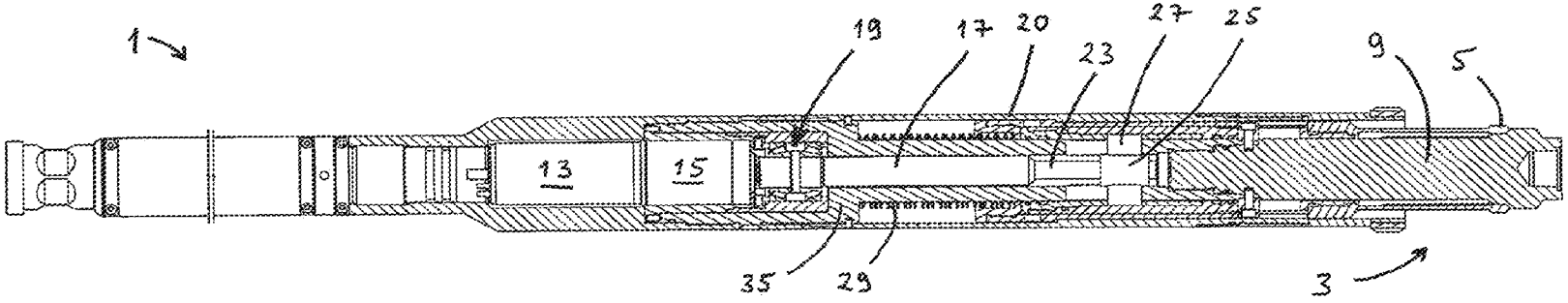
FIG. 8 is a cross section view corresponding to FIG. 2, however depicting an alternative embodiment of a fishing tool according to the present invention.
Figure 9:
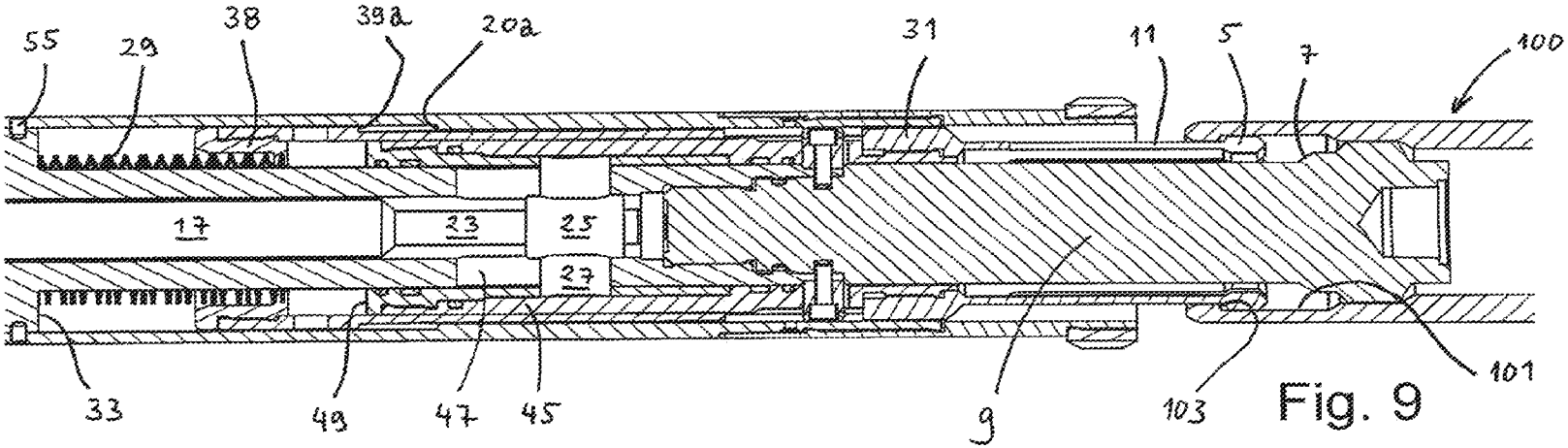
FIG. 9 is an enlarged cross section view of the embodiment according to FIG. 8, wherein the tool has entered into the bore of a fish that is provided with an internal bore profile.

FIG. 8 depicts the situation before entering into the bore 101 of the fish 100. In the situation shown in FIG. 9, the central stem 9 and the latching dogs 5 have entered into the bore 101. The latching dogs 5 have moved axially beyond the profile 103 in the fish. The situation in FIG. 9 corresponds substantially to the situation shown in FIG. 5, which was discussed above.

Figure 10:
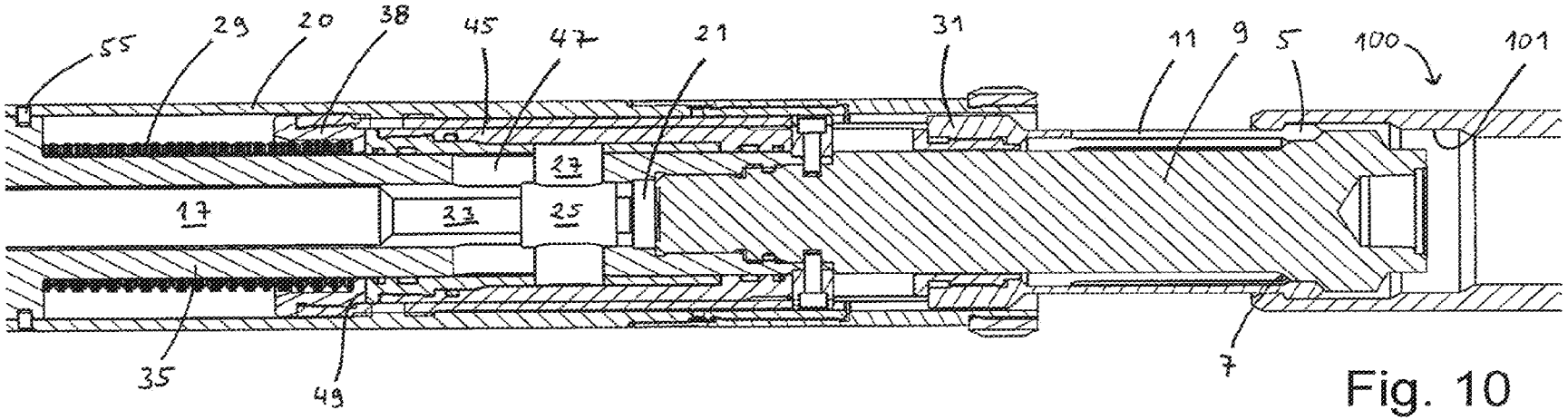
FIG. 10 is a cross section view corresponding to FIG. 9, wherein the fishing tool has been locked to the fish.
Figure 11:
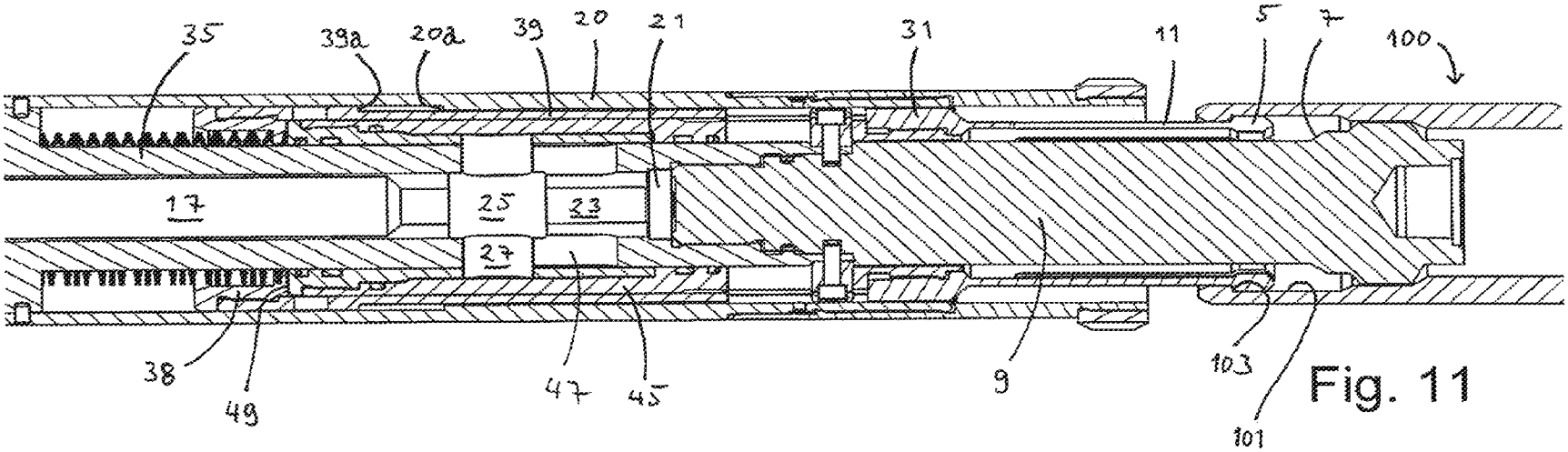
FIG. 11 is a cross section view corresponding to FIG. 10, wherein the fishing tool has been disengaged from the fish by actuation of an electrically actuated fish disengagement arrangement.

In order to set the locking engagement between the fishing tool 1 and the fish 100, the central stem 9 is pulled rearwards, so that the latching dogs 5 are prevented from moving radially inwards and out of their engagement with the profile 103. This is shown in FIG. 10.

As with the embodiment discussed with reference to FIG. 6, the tool can be released, as an auxiliary measure, by applying a mechanical force onto it in the axial forward direction.

Normally however, if the operator needs to disengage the fishing tool 1 from the fish 100, he will actuate the electric disengagement arrangement. This is, as discussed with the previous embodiment above and now depicted in FIG. 11, done by operation of the electric motor 13. Actuation of the electric motor 13 makes the disengagement sleeve 45 move axially rearwards. This makes the central stem 9 move axially forwards, so that the latching dogs 5 may move radially inwards and disengage from the profile 103 in the bore 101 of the fish 100.

Figure 12:
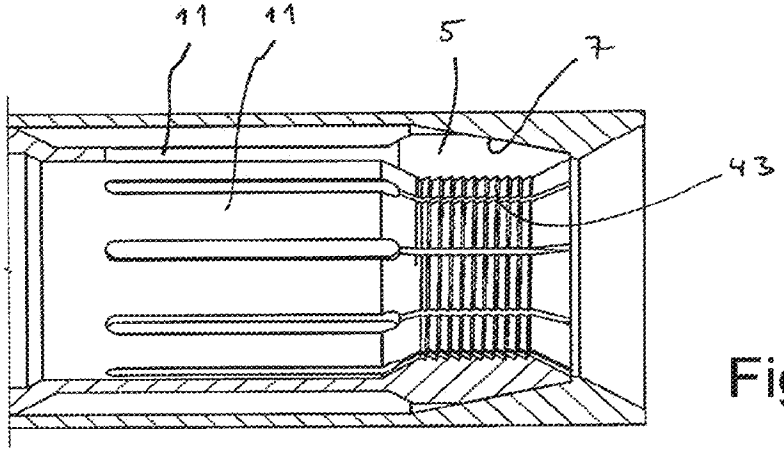
FIG. 12 depicts a front part of a fishing tool according to another embodiment of the present invention.

FIG. 12 depicts another alternative embodiment of the present invention, wherein the locking dogs 5 are configured to slide against an outer, thus inwardly facing cone 7. In this embodiment, the fishing tool is configured to engage on the external faces of a fish (not shown). Hence, latching teeth 43 on the latching dogs 5 face radially inward, and are configured to "bite" into the external face of the fish.

Figure 13:
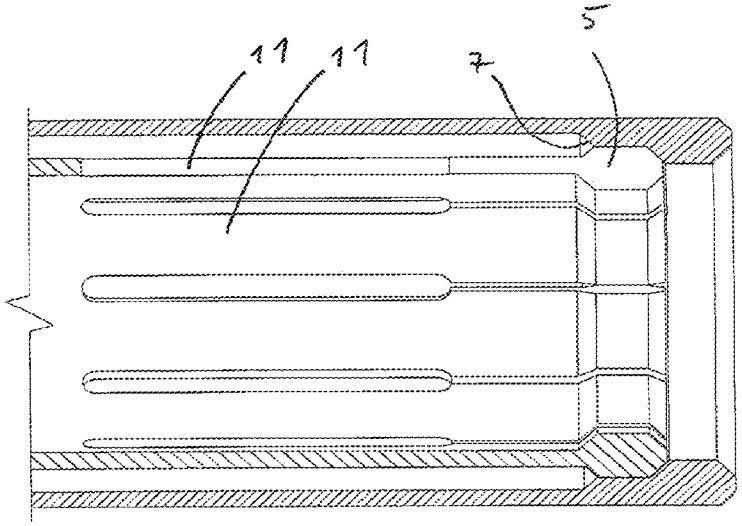
FIG. 13 depicts a front part of a fishing tool according to another embodiment of the present invention.

FIG. 13 depicts a further alternative embodiment of the present invention, wherein the locking dogs are configured to engage on an outer profile of the fish (not shown).

The fishing tool according to the embodiments depicted in FIG. 12 and FIG. 13 may have a mechanical release arrangement. However, such a mechanical disconnection arrangement may operate in a different manner than the one discussed with reference to FIG. 2 to FIG. 7, and FIG. 14 to FIG. 16. Other embodiments according to the present invention, may be without a mechanical disconnection arrangement.

Corresponding to the embodiments previously discussed, by operating the electric disengagement arrangement of the fishing tool 1, i.e. by operating the electric motor 13, the operator may retract the latching dogs 5 with respect to the cone 7. This will move the cone 7 axially forward, with respect to the latching dogs 5, and hence let the latching dogs 5 disengage from their engagement with the fish.

When the fishing tool 1, such as according to the embodiments discussed herein, or according to other embodiments falling within the scope of the present invention, is run on an electric wireline, the operator may control the electric motor 13 (and hence the disengagement arrangement) from the surface/topside.

In other embodiments, when the fishing tool 1 is run on a slick line, the fishing tool 1 may comprise a battery 51 and a control unit 53, which are schematically depicted in FIG. 2 (at a rear portion of the tool). The operator may program the control unit 53 to operate the electric motor 13 a predetermined time after starting the control unit 53. Then, should the operator not be able to retrieve the fish 100, the fishing tool 1 will automatically disengage from the fish 100 after the set time. The control unit 53 will connect power from the battery 51 to the electric motor 13, when the set time has lapsed.

Figure 14:
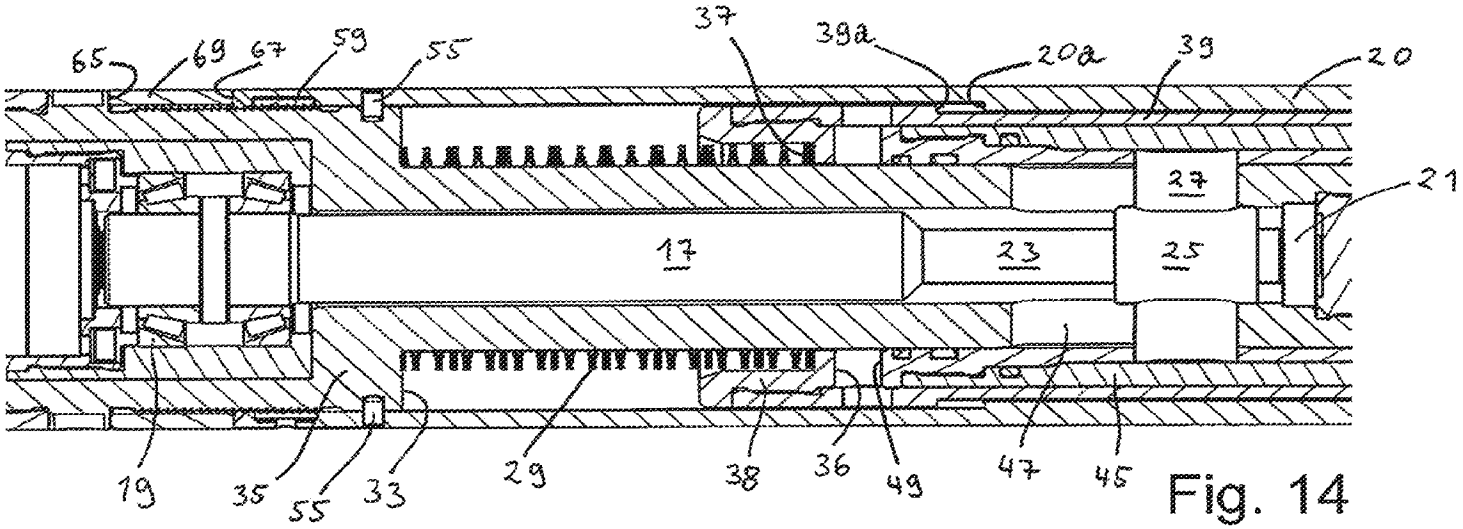
FIG. 14 and FIG. 15 are cross section cut-out views illustrating mechanical disconnection of the fishing tool from the fish.
Figure 15:
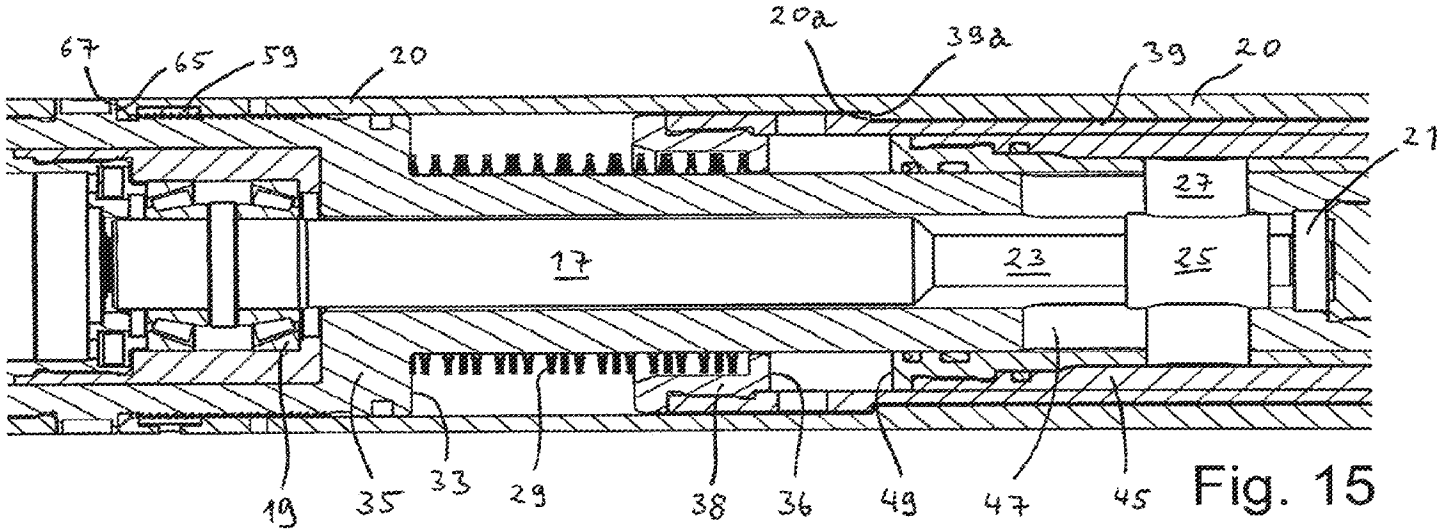
Figure 16:
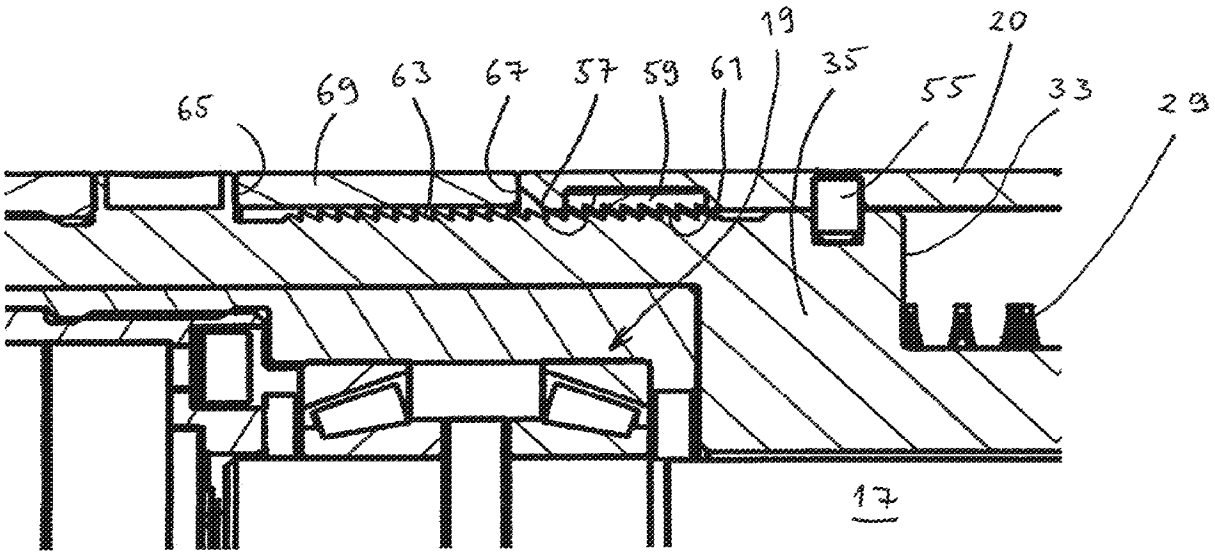
FIG. 16 is an enlarged cross section view of a portion of FIG. 14.

FIG. 14 and FIG. 15 depict details of a mechanical disengagement arrangement present in the embodiment discussed above with reference to FIG. 2 to FIG. 7. Reference is also given to FIG. 16, which depicts an enlarged portion of FIG. 14 for better view.

A rear portion of the housing sleeve 20 is positioned radially outside a rear portion of the shaft housing 35. In the situation shown in FIG. 14, the housing sleeve 20 is axially fixed with respect to the shaft housing 35 by means of some shear pins 55. The shear pins 55 extend through the housing sleeve 20 and into a threaded bore in the external face of the shaft housing 35. The rear portion of the housing sleeve 20 is provided with a ratchet ring receiving recess 57, which receives a lock ring 59, this is best visible in FIG. 16. The lock ring 59 is provided with radially inwardly directed ring ratchet profile 61, which mates with oppositely shaped, outwardly directed outer ratchet profile 63 on the outer face of the shaft housing 35. The lock ring may be a split ring.

The shaft housing 35 is provided with a stop shoulder 65 that faces axially forward (i.e. towards the fish). As shown in FIG. 14 and FIG. 16, between the stop shoulder 65 and a rear edge 67 of the housing sleeve 20, there is arranged a stop ring 69. The stop ring 69 prevents the housing sleeve 20 from moving axially backwards with respect to the shaft housing 35.

However, if the stop ring 69 is removed, the housing sleeve 20 may move axially backwards on the shaft housing 35. Such a backwardly directed force can be provided by forcing the fishing tool 1 forwards, i.e. into the well. Such a situation is shown in FIG. 7, where the forward edge of the housing sleeve 20 abuts the edges of the fish 100. The housing sleeve 20 is consequently forced radially backwards with respect to the stem 9 and the shaft housing 35, and the shear pins 55 will shear off.

When the shear pins 55 have been shorn off, the housing sleeve 20 starts to move backwards, cf. FIG. 15. The lock ring 59 is then also moved backwards with respect to the shaft housing 35, making the ring ratchet profile 61 slide over the opposite outer ratchet profile 63.

A housing sleeve edge 20a moves axially towards an oppositely facing sliding sleeve edge 39a. After some movement, the housing sleeve edge 20a will abut the sliding sleeve edge 39a, so the axial backward movement of the housing sleeve 20 pulls the sliding sleeve 39 in the same direction. Consequently, the latching dogs 5 are pulled off the cone 7, thus releasing the fishing tool 1 from the fish 100.

Eventually, the rear edge 67 of the housing sleeve 20 will abut against the stop shoulder 65 of the shaft housing 35. Due to the engagement of the ring ratchet profile 61 and the outer ratchet profile 63, the housing sleeve 20 cannot move forward on the shaft housing 35, and is thus locked in this rear position. Consequently, the latching dogs 5 cannot return into their locking position.

With the shown embodiment, the operator may thus choose to remove the stop ring 69, so that mechanical disconnection can be performed as an auxiliary measure. If the operator chooses not to allow for such auxiliary measure, the stop ring 69 simply remains on the fishing tool 1, as shown in FIG. 14.

While some embodiments of the fishing tool according to the present invention may be configured to be disengaged by applying a forward or rearward directed mechanical disengagement force, other embodiments may be without such a feature. That is, some fishing tools according to the invention may have both an electrically actuated release and a mechanical release, while other fishing tools according to the invention may have only an electrically actuated release.

Notably, the fishing tool according to the present invention is particularly well suited for being run on a wireline, such as a slick line or an electric line. However, it may also be run on other means, such as a coiled tubing or other tubular means.

In some embodiments the electric actuator, i.e. the electric motor 13 in the embodiments described above, may be activated by a primary electric signal. Alternatively, the activation may be initiated with a primary electric signal or a secondary electric signal. The primary electric signal will then be an electric signal transmitted directly from surface through an electric line, such as through an electric wireline, and the secondary electric signal will be provided with the control unit and a battery, as discussed above. In such embodiments, one will be able to pull out the fishing tool (i.e. release the fishing tool) even if there is a defect in the electric line that prevents the use of the primary electric signal.

In some embodiments, the operator may control the electric actuator in such way that the output force from the electric actuator can be predetermined. Thus, the operator may perform a first disconnection attempt using a disconnection force that is less than the maximum output force from the electric actuator. Then, should that applied force not suffice to disconnect from the fish, then the operator can increase the force in a second or succeeding disconnection attempt. If the operator is not in communication with the actuator, the operator may program the control unit accordingly. I.e. the control unit may control the electric actuator in such way that succeeding disconnection attempts can be performed. Also, an increased disconnection force may be applied in each disconnection attempt.

The invention claimed is:

1. A fishing tool configured to retrieve a fish from a wellbore, the fishing tool comprising:

a fish engagement arrangement with fish engagement means configured to lock the fishing tool to the fish inside the wellbore;

wherein the fishing tool further comprises an electrically actuated fish disengagement arrangement, which is configured to unlock the fishing tool from the fish;

wherein the electrically actuated fish disengagement arrangement comprises an electric actuator;

wherein the electrically actuated fish disengagement arrangement comprises a direct mechanical force link between the electric actuator and the fish engagement means; and wherein the direct mechanical force link is configured to connect a mechanical force from the electric actuator to the fish engagement means;

wherein the fish engagement arrangement comprises:

a cone that is axially fixed with respect to a tool housing; and a plurality of latching dogs configured to slide against the cone when moved axially with respect to the tool housing; and wherein the fish disengagement arrangement is configured to move the latching dogs with respect to the cone upon actuation.

2. The fishing tool according to claim 1, wherein the direct mechanical force link comprises a rotation to linear converter and the electric actuator is an electric rotary motor, which is connected to the rotation to linear converter.

3. The fishing tool according to claim 1, wherein the fishing tool comprises an electric battery and a control unit, wherein the control unit is programmed to perform repeated disconnection attempts, by operating the electric actuator, in a situation where a first disconnection attempt is unsuccessful.

4. The fishing tool according to claim 3, wherein the control unit is programmed to increase an output force from the electric actuator in succeeding disconnection attempts.

5. A method of retrieving the fishing tool according to claim 1 from a downhole position in a subterranean well, wherein the fishing tool is locked to the fish in the wellbore, the method comprising:

a) providing electric power to the electric actuator in the fishing tool, thereby actuating the electrically actuated fish disengagement arrangement and disengaging the fishing tool from the fish, by transferring a mechanical disconnecting force from the electric actuator to the fish engagement means over the direct mechanical force link arranged between the electric actuator and the fish engagement means.

6. The method according to claim 5, wherein step a) comprises providing electric power to an electric rotary motor and providing a linear movement of a member of the fish disengagement arrangement.

7. The method according to claim 5, wherein step a) comprises programming a control unit to provide electric power from a battery in the fishing tool to the electrically actuated fish disengagement arrangement after a predetermined time.

8. The method according to claim 5, wherein step a) comprises providing an electric signal from a surface to the electric actuator through an electric line.

9. A fishing tool configured to retrieve a fish from a wellbore, the fishing tool comprising:

a fish engagement arrangement with fish engagement means configured to lock the fishing tool to the fish inside the wellbore;

wherein the fishing tool further comprises an electrically actuated fish disengagement arrangement, which is configured to unlock the fishing tool from the fish;

wherein the electrically actuated fish disengagement arrangement comprises an electric actuator;

wherein the electrically actuated fish disengagement arrangement comprises a direct mechanical force link between the electric actuator and the fish engagement means; and wherein the direct mechanical force link is configured to connect a mechanical force from the electric actuator to the fish engagement means;

wherein the fishing tool further comprises a mechanical disconnection arrangement; and wherein:

the fish engagement arrangement comprises a cone that is axially fixed with respect to a tool housing; and the mechanical disconnection arrangement comprises one or more shear pins, configured to pull latching dogs off their engagement with the cone when the shear pins are in a shorn off state.

*10. The fishing tool according to claim 1, wherein the latching dogs are configured to engage with 1) an external face or profile of the fish or 2) an internal face, profile or bore of the fish.*

*11. The fishing tool according to claim 1, wherein:*

*the latching dogs are repeatedly and selectively movable in an axial sense relative to the cone between a wedged position and a non-wedged position.*

*12. The fishing tool according to claim 11, wherein the cone is configured to force the latching dogs to move radially when the latching dogs axially slide against the cone.*

*13. The fishing tool according to claim 11, wherein:*

*in the wedged position, the cone is configured to wedge the latching dogs against the fish, and*

*in the non-wedged position, the latching dogs are radially and/or axially spaced away from the cone, so as to allow disengagement the fishing tool from the fish.*

*14. The fishing tool according to claim 11, wherein:*

*the cone is configured to force the latching dogs to move radially in a first radial direction when the latching dogs axially slide against the cone,*

*in the wedged position, the cone is configured to substantially restrain the latching dogs against radial movement in a second radial direction, opposite the first radial direction, and*

*in the non-wedged position, the latching dogs are configured to be allowed to move radially in the first radial direction or the second radial direction.*

*15. The fishing tool according to claim 1, wherein the latching dogs are configured to engage with an external face or profile of the fish, and the latching dogs are positioned radially inwards of the cone.*

*16. The fishing tool according to claim 1, wherein the latching dogs are configured to engage with an internal face, bore or profile of the fish, and the latching dogs are positioned radially outwards of the cone.*

*17. A fishing tool configured to retrieve a fish from a wellbore, the fishing tool comprising:*

*a tool housing;*

*a fish engagement arrangement including a cone, and a plurality of latching dogs configured to slide against the cone when moved axially with respect to the tool housing, the latching dogs being configured to lock the fishing tool to the fish inside the wellbore; and*

*an electric actuator configured to selectively initiate axial movement of the latching dogs relative to the cone to allow the latching dogs to separate from the cone and to allow the fishing tool to unlock from the fish, the latching dogs being configured to move radially when sliding against the cone and when being separated from the cone.*

*18. The fishing tool according to claim 17, wherein the latching dogs are configured to engage with 1) an external face or profile of the fish or 2) an internal face, profile or bore of the fish.*

*19. The fishing tool according to claim 17, wherein:*

*each of the latching dogs is located at end of a respective latching finger; and*

*the latching dogs are repeatedly and selectively movable in an axial sense relative to the cone between a wedged position and a non-wedged position.*

*20. The fishing tool according to claim 19, wherein the cone is configured to force the latching dogs to move radially when the latching dogs axially slide against the cone.*

*21. The fishing tool according to claim 19, wherein:*

*in the wedged position, the cone is configured to wedge the latching dogs against the fish, and*

*in the non-wedged position, the latching dogs are radially and/or axially spaced away from the cone, so as to allow disengagement the fishing tool from the fish.*

*22. The fishing tool according to claim 19, wherein:*

*the cone is configured to force the latching dogs to move radially in a first radial direction when the latching dogs axially slide against the cone,*

*in the wedged position, the cone is configured to substantially restrain the latching dogs against radial movement in a second radial direction, opposite the first radial direction, and*

*in the non-wedged position, the latching dogs are configured to be allowed to move radially in the first radial direction or the second radial direction.*

*23. The fishing tool according to claim 17, wherein the latching dogs are configured to engage with an external face or profile of the fish, and the latching dogs are positioned radially inwards of the cone.*

*24. The fishing tool according to claim 23, wherein the fish includes the external profile provided on the external face of the fish, and each of the dogs includes a rear shoulder configured to engage the external profile of the fish.*

*25. The fishing tool according to claim 24, wherein the cone is configured to be positioned radially outward of the external face and profile of the fish.*

*26. The fishing tool according to claim 17, wherein the latching dogs are configured to engage with an internal face, bore or profile of the fish, and the latching dogs are positioned radially outwards of the cone.*

*27. The fishing tool according to claim 26, wherein the fish includes the internal profile provided in the bore, and each of the dogs includes a rear shoulder configured to engage the internal profile.*

*28. The fishing tool according to claim 18, wherein the cone is configured to enter inside of the bore of the fish.*

*29. A fishing tool configured to retrieve a fish from a wellbore, the fishing tool comprising:*

*a fish engagement arrangement including a plurality of latching dogs configured to lock the fishing tool to the fish inside the wellbore,*

*an electrically actuated fish disengagement arrangement configured to unlock the fishing tool from the fish, wherein the electrically actuated fish disengagement arrangement comprises an electric actuator and a mechanical force link between the electric actuator and the latching dogs; and*

*wherein the mechanical force link is configured to connect a mechanical force from the electric actuator to the latching dogs,*

*wherein the fish engagement arrangement comprises:*

*a cone that is axially fixed with respect to a tool housing;*

*wherein the latching dogs are configured to slide against the cone when moved axially with respect to the tool housing; and*

*wherein the fish disengagement arrangement is configured to move the latching dogs with respect to the cone upon actuation.*

*30. The fishing tool according to claim 29, wherein the latching dogs are configured to engage with 1) an external face or profile of the fish or 2) an internal face, profile or bore of the fish.*

*31. The fishing tool according to claim 29, wherein:*

*the latching dogs are repeatedly and selectively movable in an axial sense relative to the cone between a wedged position and a non-wedged position.*

*32. The fishing tool according to claim 31, wherein:*

*in the wedged position, the cone is configured to wedge the latching dogs against the fish, and*

*in the non-wedged position, the latching dogs are radially and/or axially spaced away from the cone, so as to allow disengagement the fishing tool from the fish.*

*33. The fishing tool according to claim 32, wherein:*

*the cone is configured to force the latching dogs to move radially in a first radial direction when the latching dogs axially slide against the cone,*

*in the wedged position, the cone is configured to substantially restrain the latching dogs against radial movement in a second radial direction, opposite the first radial direction, and*

*in the non-wedged position, the latching dogs are configured to be allowed to move radially in the first radial direction or the second radial direction.*

*34. The fishing tool according to claim 29, wherein the latching dogs are configured to engage with an external face or profile of the fish, and the latching dogs are positioned radially inwards of the cone.*

*35. The fishing tool according to claim 34, wherein the fish includes the external profile provided on the external face of the fish, and each of the dogs includes a rear shoulder configured to engage the external profile of the fish.*

*36. The fishing tool according to claim 35, wherein the cone is configured to be positioned radially outward of the external face and profile of the fish.*

*37. The fishing tool according to claim 29, wherein the latching dogs are configured to engage with an internal face, bore or profile of the fish, and the latching dogs are positioned radially outwards of the cone.*

*38. The fishing tool according to claim 37, wherein the fish includes the internal profile provided in the bore, and each of the dogs includes a rear shoulder configured to engage the internal profile.*

*39. The fishing tool according to claim 38, wherein the cone is configured to enter inside of the bore of the fish.*

*40. The fishing tool according to claim 1, wherein the direct mechanical force link comprises a rotating shaft, a rotation-to-linear converter, a disengagement sleeve and latching fingers with ends on which the latching dogs are arranged.*

*41. The fishing tool according to claim 9, wherein the direct mechanical force link comprises a rotating shaft, a rotation-to-linear converter, a disengagement sleeve and latching fingers with ends on which the latching dogs are arranged.*

* * * * *